United States Patent
Brannon et al.

(10) Patent No.: US 11,921,865 B2
(45) Date of Patent: *Mar. 5, 2024

(54) SYSTEMS AND METHODS FOR IDENTIFYING DATA PROCESSING ACTIVITIES BASED ON DATA DISCOVERY RESULTS

(71) Applicant: OneTrust, LLC, Atlanta, GA (US)

(72) Inventors: Jonathan Blake Brannon, Smyrna, GA (US); Kevin Jones, Atlanta, GA (US); Saravanan Pitchaimani, Atlanta, GA (US); Dylan D. Patton-Kuhl, Atlanta, GA (US); Ramana Malladi, Atlanta, GA (US); Subramanian Viswanathan, San Ramon, CA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,435

(22) Filed: Mar. 14, 2023

(65) Prior Publication Data
US 2023/0214501 A1 Jul. 6, 2023

Related U.S. Application Data

(63) Continuation of application No. 17/828,953, filed on May 31, 2022, now Pat. No. 11,615,192, which is a
(Continued)

(51) Int. Cl.
*G06F 21/57* (2013.01)
*G06F 21/60* (2013.01)
(Continued)

(52) U.S. Cl.
CPC .......... *G06F 21/577* (2013.01); *G06F 21/602* (2013.01); *G06F 21/6245* (2013.01);
(Continued)

(58) Field of Classification Search
CPC ..... G06F 21/577; G06F 21/602; G06N 20/00; G06V 30/248; G06V 30/2528
See application file for complete search history.

(56) References Cited

U.S. PATENT DOCUMENTS 6,721,713 B1 * 4/2004 Guheen .................. G06Q 50/01
715/202
6,754,665 B1 * 6/2004 Futagami ............ G06F 21/6245
707/999.102

(Continued)

*Primary Examiner* — Fayyaz Alam
(74) *Attorney, Agent, or Firm* — Keller Preece PLLC

(57) ABSTRACT

Aspects of the present invention provide methods, apparatuses, systems, computing devices, computing entities, and/or the like for identifying data processing activities associated with various data assets based on data discovery results. In accordance various aspects, a method is provided comprising: identifying and scanning data assets to detect a subset of the data assets, wherein each asset of the subset is associated with a particular data element used for target data; generating a prediction for each pair of data assets of the subset on the target data flowing between the pair; identifying a data flow for the target data based on the prediction generated for each pair; and identifying a data processing activity associated with handling the target data based on a correlation identified for the particular data element, the subset, and/or the data flow with a known data element, subset, and/or data flow for the data processing activity.

20 Claims, 7 Drawing Sheets

Related U.S. Application Data continuation of application No. 17/520,272, filed on Nov. 5, 2021, now Pat. No. 11,397,819.

(60) Provisional application No. 63/110,557, filed on Nov. 6, 2020.

(51) Int. Cl.
*G06F 21/62* (2013.01)
*G06N 20/00* (2019.01)
*G06V 30/24* (2022.01)

(52) U.S. Cl.
CPC ........... *G06N 20/00* (2019.01); *G06V 30/248* (2022.01); *G06F 2221/033* (2013.01); *G06V 30/2528* (2022.01)

(56) References Cited

U.S. PATENT DOCUMENTS

| | | | |
|---|---|---|---|
| 7,124,107 B1* | 10/2006 | Pishevar | G06Q 30/06 705/37 |
| 2019/0050596 A1* | 2/2019 | Barday | H04L 63/1433 |
| 2020/0004968 A1* | 1/2020 | Brannon | G06F 21/577 |

* cited by examiner

SYSTEMS AND METHODS FOR IDENTIFYING DATA PROCESSING ACTIVITIES BASED ON DATA DISCOVERY RESULTS

CROSS-REFERENCE TO RELATED APPLICATIONS

This application is a continuation of U.S. patent application Ser. No. 17/828,953, filed May 31, 2022, which is a continuation of U.S. patent application Ser. No. 17/520,272, filed Nov. 5, 2021, now U.S. Pat. No. 11,397,819, issued Jul. 26, 2022, which claims the benefit of U.S. Provisional Patent Application Ser. No. 63/110,557, filed Nov. 6, 2020, which are hereby incorporated herein by reference in their entirety.

TECHNICAL FIELD

The present disclosure is generally related to computing systems and methods used for identifying data processing activities associated with various data assets based on data discovery results produced for the various data assets.

BACKGROUND

Many entities handling (e.g., collecting, receiving, transmitting, storing, processing, sharing, and/or the like) certain types of data that may be found over multiple data sources may be tasked with performing actions on the data that involve locating certain portions of the data over the multiple data sources. However, as the quantity of data increases over time, and/or as the number of systems that may be potentially handling data increases, as well as the number of data sources used in handling data increases, determining how particular data has been handled (e.g., collected, received, transmitted, stored, processed, shared, and/or the like) across all of the potential systems, data sources, and/or the like can be significantly difficult. Accordingly, a need exists in the art for meeting the technical challenges in identifying, locating, and managing data found over multiple data sources.

SUMMARY

In general, various aspects of the present invention provide methods, apparatuses, systems, computing devices, computing entities, and/or the like are provided. In accordance various aspects, a method is provided that comprises: executing, by computing hardware, a processing activity to inject test data into a computing system, wherein: the test data represents target data; the computing system comprises a plurality of data assets; and executing the processing activity to inject the test data into the computing system causes a propagation of the test data through the plurality of data assets for the computing system; scanning, by the computing hardware, the plurality of data assets to identify a subset of data assets found in the plurality of data assets, wherein the test data is found in each data asset in the subset of data assets; identifying, by the computing hardware, a plurality of data elements associated with the subset of data assets that are used for the target data based on the plurality of data elements containing the target data; identifying, by the computing hardware and based on the propagation of the test data through the plurality of data assets for the computing system, a data flow for the target data between the subset of data assets; generating, by the computing hardware, at least one association between at least one of the processing activity, the subset of data assets, the plurality of data elements, or the data flow for the target data; and causing, by the computing hardware and based on the at least one association, performance of an action involving the target data.

In some aspects, the method further comprises identifying the plurality of data assets associated with the computing system via software installed within the computing system that scans the computing system to identify the plurality of data assets. In some aspects, the method further comprises comprising identifying, by the computing hardware and based on at least one of the subset of data assets, the plurality of data elements, or the data flow, a second processing activity that involves handing the target data. In some aspects, identifying the second processing activity is performed using a data repository comprising information on at least one of known data elements, known data assets, or known processing activities.

In some aspects, scanning the plurality of data assets involves installing software within the computing system that scans each data asset of the plurality of data assets to identify the subset of data assets. In some aspects, the action comprises: receiving a request from an individual to at least one of view, receive, access, revise, or delete the target data for the individual from the computing system; identifying, based on the at least one association, the target data found in the computing system for the individual; and processing the request to at least one of provide, revise, or delete the target data found in the computing system for the individual. In some aspects, the action comprises: identifying a risk associated with at least one of the processing activity, the subset of data assets, the plurality of data elements, or the data flow; and responsive to identifying the risk, performing at least one of communicating the risk to an individual, initiating a process to suspend the processing activity, or initiating a process to encrypt the target data.

In accordance with various aspects, a system is provided comprising a non-transitory computer-readable medium storing instructions and a processing device communicatively coupled to the non-transitory computer-readable medium. Accordingly, the processing device is configured to execute the instructions and thereby perform operations comprising: injecting test data into a computing system, wherein: the test data represents target data; the computing system comprises a plurality of data assets; and injecting the test data into the computing system causes a propagation of the test data through the plurality of data assets for the computing system; scanning the plurality of data assets to identify a subset of data assets found in the plurality of data assets, wherein the test data is found in each data asset in the subset of data assets; identifying a plurality of data elements associated with the subset of data assets that are used for the target data based on the plurality of data elements containing the target data; identifying, based on the propagation of the test data through the plurality of data assets for the computing system, a data flow for the target data between the subset of data assets; generating at least one association between at least one of the subset of data assets, the plurality of data elements, or the data flow for the target data; and causing, based on the at least one association, performance of an action involving the target data.

In some aspects, the operations further comprise identifying the plurality of data assets associated with the computing system from information gathered by software installed within the computing system that scans the computing system. In some aspects, the operations further comprising identifying, based on at least one of the subset of data assets, the plurality of data elements, or the data flow, a processing activity that involves handing the target data. In some aspects, identifying the processing activity is performed using a data repository comprising information on at least one of known data elements, known data assets, or known processing activities.

In some aspects, scanning the plurality of data assets involves installing software within the computing system that scans each data asset of the plurality of data assets to identify the subset of data assets. In some aspects, the action comprises: receiving a request from an individual to at least one of view, receive, access, revise, or delete the target data for the individual from the computing system; identifying, based on the at least one association, the target data found in the computing system for the individual; and processing the request to at least one of provide, revise, or delete the target data found in the computing system for the individual. In some aspects, injecting the test data into the computing system comprises at least one of executing a processing activity to inject the test data into the computing system or entering the test data into an input computing system connected to the computing system to inject the test data into the computing system.

In accordance with various aspects, a non-transitory computer-readable medium storing computer-executable instructions is provided. The computer-readable instructions, when executable by computing hardware, configure the computing hardware to perform operations comprising: injecting test data into a computing system, wherein: the test data represents target data; the computing system comprises a plurality of data assets; and injecting the test data into the computing system causes a propagation of the test data through the plurality of data assets for the computing system; scanning the plurality of data assets to identify a subset of data assets found in the plurality of data assets, wherein the test data is found in each data asset in the subset of data assets; identifying, based on the propagation of the test data through the plurality of data assets for the computing system, a data flow for the target data between the subset of data assets; identifying, based on at least one of the subset of data assets or the data flow, a processing activity associated with the subset of data assets that is used for handling the target data; generating at least one association between at least one of the processing activity, the subset of data assets, or the data flow for the target data; and causing, based on the at least one association, performance of an action involving the target data.

In some aspects, the operations further comprise identifying the plurality of data assets associated with the computing system from information gathered by software installed within the computing system that scans the computing system. In some aspects, identifying the processing activity is performed using a data repository comprising information on at least one of known data assets or known processing activities. In some aspects, scanning the plurality of data assets involves installing software within the computing system that scans each data asset of the plurality of data assets to identify the subset of data assets.

In some aspects, the action comprises: receiving a request from an individual to at least one of view, receive, access, revise, or delete the target data for the individual from the computing system; identifying, based on the at least one association, the target data found in the computing system for the individual; and processing the request to at least one of provide, revise, or delete the target data found in the computing system for the individual. In some aspects, injecting the test data into the computing system comprises at least one of executing a second processing activity to inject the test data into the computing system or entering the test data into an input computing system connected to the computing system to inject the test data into the computing system.

BRIEF DESCRIPTION OF THE DRAWINGS

In the course of this description, reference will be made to the accompanying drawings, which are not necessarily drawn to scale, and wherein.

DETAILED DESCRIPTION

Figure 1:
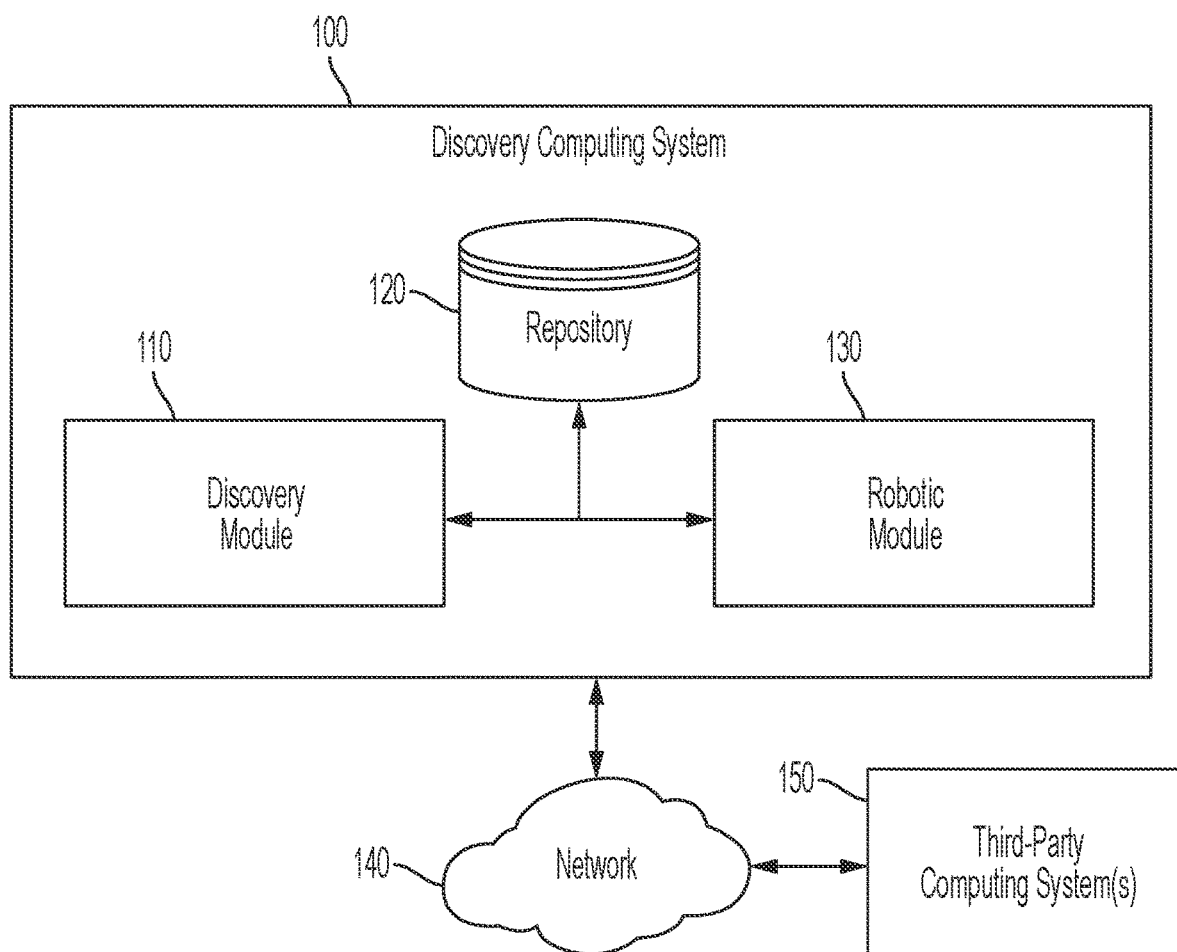
FIG. 1 depicts an example of a computing environment that can be used for identifying various data assets and data processing activities associated with target data that may be spread over one or more computing systems in accordance with various aspects of the present disclosure.

Various aspects for practicing the technologies disclosed herein are described more fully hereinafter with reference to the accompanying drawings, in which some, but not all aspects of the technologies disclosed are shown. Indeed, various aspects disclosed herein are provided so that this disclosure will satisfy applicable legal requirements and should not be construed as limiting or precluding other aspects applying the teachings and concepts disclosed herein. Like numbers in the drawings refer to like elements throughout.

Overview and Technical Contributions of Various Aspects

Many entities handling (e.g., collecting, receiving, transmitting, storing, processing, sharing, and/or the like) certain types of data that may be associated with multiple data assets found within multiple computing systems may be tasked with performing actions on the data that involve having to locate the data over the multiple data assets. For example, an entity that handles sensitive and/or personal information associated with particular individuals, such as personally identifiable information (PII) data, that is associated with multiple data assets found within multiple computing systems may be subject to having to retrieve and perform actions on the sensitive and/or personal data for a particular individual (e.g., data subject) upon request by the particular individual, such as reporting, updating, deleting, and/or the like the sensitive and/or personal data stored and/or processed for the individual with respect to the multiple data assets.

As the quantity of data increases over time, and/or as the number of data assets, computing systems, and/or data processing activities that may be potentially handling the data increases, determining how particular data has been handled (e.g., collected, received, transmitted, stored, processed, shared, and/or the like) across all of the potential data assets, computing systems, data processing activities, and/or the like can be difficult. Accordingly, discovering particular data (e.g., target data) across multiple data assets, computing systems, data processing activities, and/or the like may become even more challenging when each of the data assets, systems, data processing activities, and/or the like may use their own, possibly unique, process of identifying the particular data. That is to say, where different attributes, procedures, techniques, and/or the like of identifying target data are used across multiple systems, data sources, data processing activities, and/or the like, locating specific target data, especially specific target data associated with a particular individual, may not be feasible by simply using a common mechanism (e.g., username) for all the different systems.

Accordingly, various aspects of the present disclosure overcome many of the technical challenges associated with handling target data as mentioned above. Specifically, various aspects of the disclosure are directed to a data discovery process used for identifying data elements, data assets, and/or data processing activities associated with handling target data that may be spread over multiple computing systems. The data discovery process may involve identifying and scanning a plurality of data assets found over the multiple computing systems to identify data elements for the data assets that are used in handling the target data. For example, a data element may be considered a data field used by a data asset in storing target data. Attributes of the data elements and/or data assets may be used in identifying those data elements used in handling the target data. The data discovery process may continue with identifying data flows for the target data between data assets by identifying similar data elements used for the target data in each of the data assets. In addition, the data discovery process may identify data processing activities that may be involved in handling the target data based on the data assets found within in the data flows.

Furthermore, according to some aspects, the data discovery process may involve identifying data assets that may be associated with particular data elements found in the target data, as well as data assets that may be associated with particular data processing activities, by injecting test data for the particular data elements into the multiple computing systems and then scanning the data assets found in the systems to identify how the test data has propagated through the data assets. Associations can then be identified between the particular data elements, data processing activities involved in handing the test data, and/or data assets in which the test data has been found due to the propagation of the test data.

Accordingly, various aspects of the disclosure provided herein are effective, efficient, timely, and accurate in identifying processing activities and/or data assets associated with target data from large volumes of data, spread over multiple computing systems. As a result, various aspects of the disclosure enable the building of data models for more efficiently querying the target data from large volumes of data that may be spread over multiple computing systems. In addition, various aspects of the disclosure provided herein can facilitate the identification and/or documentation of target data present within large volumes of data, spread over various data assets, as well as facilitate the retrieval of target data for an individual (e.g., data subject), that could not normally be carried out using conventional practices, systems, and infrastructures. Further, various aspects of the disclosure can carry out data processing that cannot be feasibly performed by a human, especially when such data processing involves large volumes of data. This is especially advantageous when data processing must be carried out over a reasonable timeframe to allow for relevant observations to be gathered from the data and/or relevant operations to be performed on the data. In doing so, various aspects of the present disclosure make major technical contributions to improving the computational efficiency and reliability of various automated computing systems and procedures for processing large volumes of data to identify and/or process target data. This in turn translates to more computationally efficient systems, as well as software applications. Further detail is now provided for various aspects of the disclosure.

It is noted that reference is made to target data throughout the remainder of the application. However, target data is not necessarily limited to information that may be considered as personal and/or sensitive in nature but may also include other forms of information that may be of interest. For example, target data may include data on a particular subject of interest, such as a political organization, manufactured product, current event, and/or the like. Further, target data may not necessarily be associated with an individual but may be associated with other entities such as a business, organization, government, association, and/or the like.

Example Computing Environment

FIG. 1 depicts an example of a computing environment that can be used for identifying various data assets and data processing activities associated with target data that may be spread over one or more computing systems according to various aspects. For example, a data asset may be a subsystem, software application, website, mobile application, data storage/repository, external system, and/or the like. A data processing activity may be a process, action, exercise, and/or the like that involves performing some type of processing, collecting, accessing, storing, retrieving, revising, deleting, and/or the like of target data. For example, a data processing activity may involve collecting and processing a visitor's credit card information who is visiting a website and purchasing a product on the website. Here, the target data may be considered the credit card information and the data processing activity may involve collecting the credit card information through a form (e.g., webpage) provided via the website and processing the credit card information with the appropriate card provider to process the purchase of the product. The data processing activity involving the credit card information may be associated with one or more data assets. For example, the data processing activity may involve encrypting and storing the visitor's credit card information in a data repository of an entity (e.g., e-commerce business) associated with the website.

Accordingly, an entity (e.g., third-party) that conducts several data processing activities involving numerous data assets may be interested in understanding the data processing activities and/or data assets associated with the handling of target data that may be spread over one or more computing systems of the entity. The term "handling" is used throughout the remainder of the specification in discussing various aspects of the disclosure with identifying data processing activities and/or data assets for target data although those of ordinary skill in the art should understand that "handling" may involve performing various types of activities for the target data such as processing, collecting, accessing, storing, retrieving, revising, deleting, and/or the like of the target data.

A discovery computing system 100 may be provided that includes software components and/or hardware components for identifying various data processing activities and/or data assets associated with the target data for the entity that may be spread over the one or more third-party computing systems 150. Accordingly, the discovery computing system 100 may include one or more interfaces (e.g., application programming interfaces (APIs)) for communicating, accessing, and analyzing the third-party computing system(s) over a network 140 (e.g., the Internet). For example, the discovery computing system 100 may be provided as a service that is available over the network 140 in which a user (e.g., personnel of the entity) may access the service and provide information necessary (e.g., credentials) for the discovery computing system 100 to perform the data discovery process for the one or more third-party computing systems 150 for the entity.

According to various aspects of the disclosure, the discovery computing system 100 may comprise computing hardware performing a number of different processes in identifying data processing activities and/or data assets for target data. Specifically, according to particular aspects, the discovery computing system 100 executes a discovery module 110 in identifying data processing activities associated with various data assets that involve target data. As further detailed herein, the discovery module 110 scans the data assets found in the third-party computing system(s) for target data. The discovery module 110 can then identify data flows for the target data between data assets by identifying similar data elements for the target data in each of the data assets. The discovery module 110 then identifies the data processing activities that may be involved in handling the target data based on the data assets involved in the data flows. According to particular aspects, the discovery module 110 performs the identification using attributes of the data assets, the identified data flows between data assets, and/or attributes of data processing activities as detailed in a data repository 120 providing information on various known data processing activities.

Accordingly, the discovery computing system 100 may also include a robotic module 130 that may be invoked by the discovery module 110 and/or executed as a stand-alone module. The robotic module 130 can be used to identify data assets that may be associated with particular data elements found in the target data, as well as data assets that may be associated with particular data processing activities. In addition, the robotic module 130 can be used in identifying data flows between data assets involving the target data. Further, the robotic module 130 can be used in populating the data repository 120 with associations identified between data processing activities, various data assets, and/or various data elements associated with the target data. The robotic module 130 can inject test data for one or more data elements of the target data through an input computing system into the third-party computing system(s) 150 and then scan the data assets found in the third-party system(s) 150 to identify how the test data has propagated through the data assets. The robotic module 130 may then generate associations between the one or more data elements, data processing activities involved in handing the test data, and/or data assets in which the test data has been found due to the propagation of the test data. The robotic module 130 may then save these associations in the data repository 120 so that the association can be used by the discovery module 110 in performing the data discovery process on the one or more third-party computing systems 150, as well as in performing future data discovery processes. Further detail is now provided on the configuration and functionality of the discovery module 110 and robotic module 130 according to various aspects of the disclosure.

Discovery Module

Figure 2:
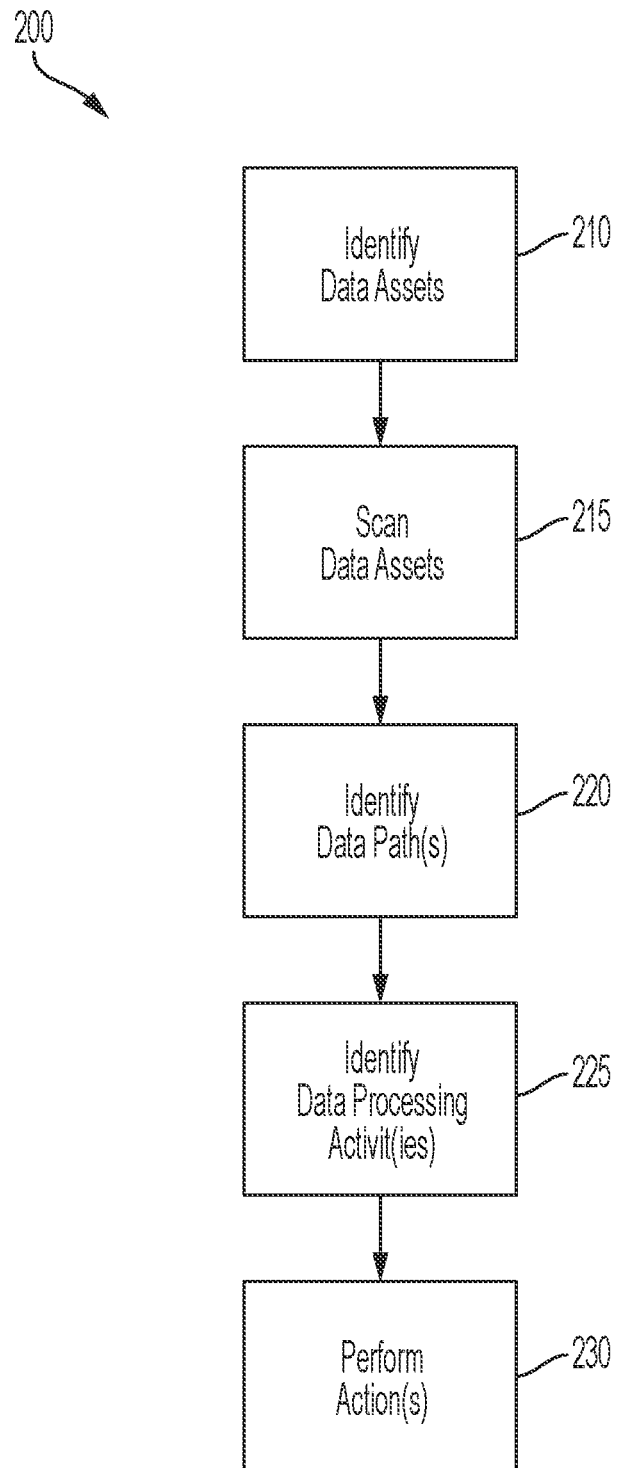
FIG. 2 is a flowchart of a process for identifying data processing activities associated with various data assets in accordance with various aspects of the present disclosure.

Turning now to FIG. 2, additional details are provided regarding a discovery module 110 for identifying various processing activities and/or data assets involved in handling target data in accordance with various aspects of the disclosure. For instance, the flow diagram shown in FIG. 2 may correspond to operations carried out, for example, by computing hardware found in the discovery computing system 100 as described herein, as the computing hardware executes the discovery module 110.

The process 200 involves the discovery module 110 identifying a plurality of data assets associated with (e.g., found in) one or more computing systems 150 for a third-party in Operation 210. According to particular aspects, the discovery module 110 may communicate with the third-party computing system(s) 150 through one or more interfaces so that the discovery module 110 can access the computing system(s) 150. For example, the discovery module 110 may use one or more APIs to communicate and access the third-party computing system(s) 150. According to some aspects, the discovery module 110 may download and/or install software (e.g., system crawler, spider, bot, and/or the like) within the third-party computing system(s) 150 that can be used in identifying the plurality of data assets. Accordingly, the software may scan each of the third-party computing system(s) 150 to identify the various data assets that may be associated with each of the computing systems 150.

Figure 3:
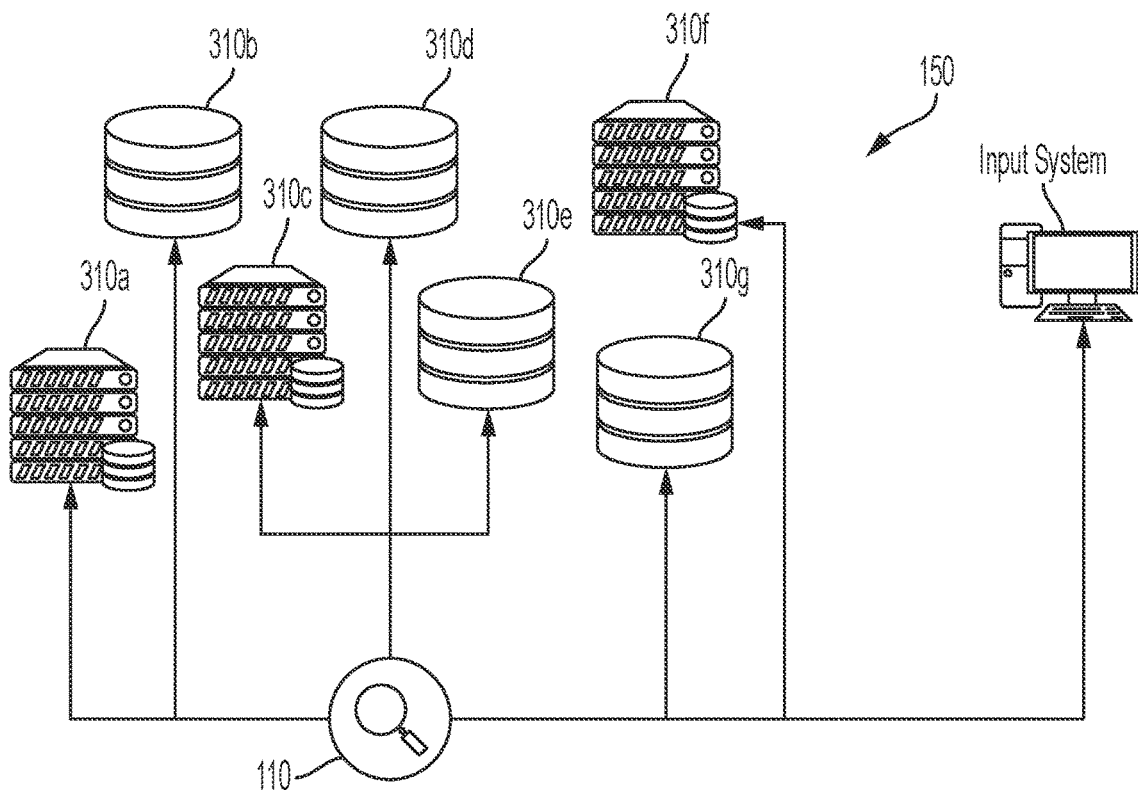
FIG. 3 depicts an example of discovering data assets found in one or more computing systems in accordance with various aspects of the present disclosure.

Turning briefly to FIG. 3, an example is provided in which the discovery module 110 has been communicatively connected to one or more third-party computing systems 150 to scan the computing systems 150 to identify a plurality of data assets 310a-g. Accordingly, the discovery module 110 may download and/or install software within the one or more third-party computing systems 150 to scan the computing systems 150 to facilitate the identifying of the plurality of data assets 310a-g.

In addition, the discovery module 110 may use information provided on the third-party system(s) 150 in identifying the plurality of data assets associated with the system(s) 150. For instance, the third-party (e.g., entity) associated with the computing system(s) 150 may provide information on the system(s) that may help the discovery module 110 in identifying the plurality of data assets. For example, the information may include the different types of data assets that can be found in the third-party system(s) 150, the different types of data processing activities that are carried out for handling target data in the third-party system(s) 150, credentials that may be used by the discovery module 110 in accessing the third-party system(s) 150, and/or the like. According to some aspects, the discovery module 110 may not necessarily scan the third-party computing system(s) 150, but may instead identify the plurality of data assets solely through the information provided on the data assets.

In Operation 215, the discovery module 110 scans each of the discovered data assets associated with the third-party system(s) 150 to detect data elements stored by and/or associated with each data asset. Similar to scanning the third-party system(s) 150 to identify the plurality of data assets, the discovery module 110, according to particular aspects, may download and/or install software (e.g., system crawler, spider, bot, and/or the like) on the third-party system(s) 150 that then analyzes the data assets in identifying the data elements stored by and/or associated with the data assets. A "data element" can be considered a unit of data that has particular meaning and/or particular semantics. For example, a common type of data element is a data field found in a data record stored in a data repository. Here, the discovery module 110 may identify the data elements for each of the data assets that make up a part of the target data. For instance, the target data may entail personal data found and handled within the third-party system(s) and therefore, a data element identified by the discovery module 110 may involve a particular unit of personal data such as a data field utilized by a data asset that stores personal data such as, for example, an individual's social security number.

According to various aspects, the discovery module 110 may use different information, instruments, and/or combinations thereof in identifying the data elements associated with the target data. For instance, the discovery module 110 can use metadata associated with a particular data asset in identifying the data elements associated with the data asset and the purpose for the data elements. For example, the metadata may indicate the data asset accesses a data element that is used for storing target data in the form of an individual's telephone number. The discovery module 110 may access the metadata in a data source (e.g., a data repository) found in the third-party computing system(s) 150 or the metadata may be provided to the discovery module 110 by the third party for use.

In other instances, the discovery module 110 may use a machine-learning model in identifying those data elements of a data asset that are associated with the target data. For example, the discovery module 110 may use a machine-learning model that is a supervised, unsupervised, or semi-supervised trained model that generates a prediction (e.g., classification) for a data element as to whether or not the data element is associated with the target data. Accordingly, the machine-learning model may comprise a classifier such as logistic regression algorithm, clustering algorithm, decision tree, neural network, and/or the like. According to particular aspects, the machine-learning model may process metadata for a particular data element in generating a prediction for the data element. In some instances, the prediction may simply indicate whether the data element is associated with the target data or not. For instance, if the target data is personal or sensitive data, the prediction may indicate that a data element such as a social security number is associated with the target data or that a data element such as a cost for a product is not associated with the target data. In other instances, the prediction may identify the data element as a particular type of target data such as, for example, a first name, last name, address, telephone number, and/or the like. That is to say, the machine-learning model may include a classifier that generates a prediction of a type of data applicable to the target data.

For example, the machine-learning model may generate a representation (e.g., a vector) comprising a component for each of the different types of target data in which the component provides the prediction on the likelihood of the data element being the corresponding type of target data. Therefore, the discovery module 110 may identify the data element as being a particular type of target data based on the prediction for the particular type of target data satisfying a threshold (e.g., having a prediction value of 0.85 or greater). In addition, the machine-learning model may generate a confidence (confidence value) that is provided along with each prediction. The confidence may represent the machine-learning model's confidence in its generated prediction of the data element's likelihood of being a particular type of data. According to some aspects, the discovery module 110 may also use the confidence in identifying a type of target data for the data element. For example, the discovery module 110 may identify a type of target data for the data element based on: (1) the prediction for the type of data satisfying a first threshold, and (2) the confidence for the prediction satisfying a second threshold.

In a particular example, the machine-learning model may generate a prediction (e.g., for whether a particular data element is a particular type of target data) that includes a value between zero (representing a prediction that the data element is not the particular type of target data) and one (representing a prediction that the data element is the particular type of target data). The prediction value may vary between zero and one based on a likelihood that the particular data element is the particular type of target data according to the machine-learning model. The machine-learning model may then, in various aspects, generate a separate confidence score for the prediction value (e.g., a confidence score between zero and one) that represents the machine-learning model's confidence in the prediction. In this way, the discovery module 110 may identify the type of target data for the data element by comparing the prediction to a first threshold (e.g., to determine whether the prediction satisfies the first threshold) and comparing the confidence level to a second threshold (e.g., to determine whether the confidence level satisfies the second threshold). The discovery module 110 may then assign the type of target data to the data element when the prediction satisfies the first threshold, and the confidence level satisfies the second threshold.

The discovery module 110 may group one or more of the identified data elements into unique datasets of elements. A unique dataset may include data elements that are associated with a single data asset or a subset of data assets. For example, the discovery module 110 may group one or more data elements identified for a single data asset into a unique dataset used in storing personally identifiable information (PII) for individuals. In addition, the discovery module 110 may identify data elements that are common among a subset of data assets. Here, the discovery module 110 may use one or more attributes of the data elements in grouping them together to form the unique datasets, as well as to find common data elements among the plurality of data assets. Such attributes may be found in metadata for each of the data elements.

Figure 4:
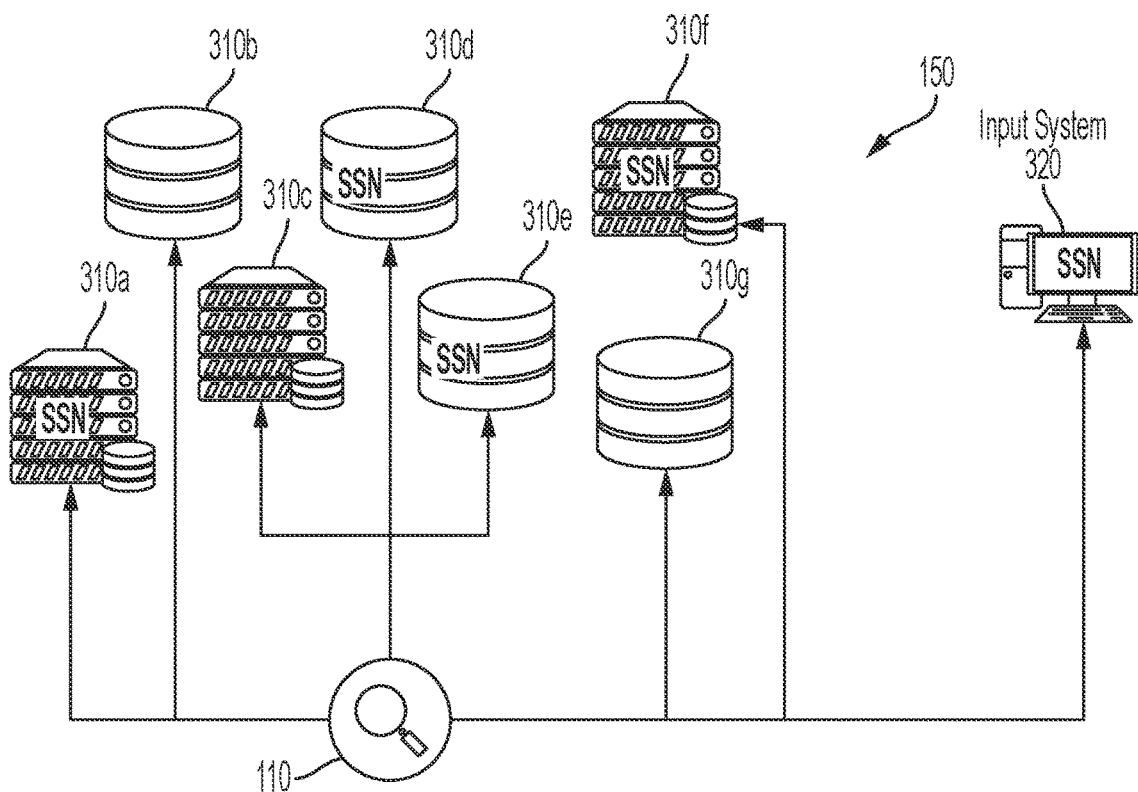
FIG. 4 depicts an example of determining a common data element for various data assets found in one or more computing systems in accordance with various aspects of the present disclosure.

For instance, FIG. 4 depicts an example of the discovery module 110 identifying a common data element among various data assets of the plurality of data assets 310*a-g*. Here, the discovery module 110 has identified, in multiple data assets, a common data element having an attribute (e.g., data type) indicating the data element is used in storing a social security number (SNN) of an individual. The discovery module 110 has identified the common data element as being associated with a subset of the data assets 310*a-g* that includes data assets 310*a*, 310*d*, 310*f*, 310*e*. Therefore, the discovery module 110 may group the common data element (SNN) among the subset of data assets 310*a-g* as a unique dataset. In this example, the discovery module 110 may identify the common data element is also associated with a data asset found in an input computing system 320. As discussed further herein, the input computing system 320 can be used in injecting test data into the one or more third-party computing systems 150 to identify data assets (e.g., subsets of data assets found in the plurality of data assets) that are associated with particular data elements of the target data.

According to particular aspects, the discovery module 110 may use a rules-based model in grouping the data elements into unique datasets and/or identifying common data elements among the data assets. The rules-based model may process a set of rules in determining those data elements identified for a data asset that should be grouped into a unique dataset and/or that are common among the data assets. For example, the set of rules may include one or more rules that indicate data elements having an attribute identifying the data elements are used in storing PII should be grouped into a unique dataset. Accordingly, the set of rules may be stored within a data repository found in the discovery computing system 100, or a third-party computing system 150, that is accessible by the discovery module 110.

At Operation 220, the discovery module 110 identifies one or more data flows for the target data. A data flow for the target data generally includes a subset of the data assets in which the target data flows between the data assets found in the subset. According to various aspects, the discovery module 110 may use a (second) machine-learning model in identifying a data flow for a subset of data assets. The machine-learning model may process the data elements identified for each of the data assets (e.g., attributes of the data elements for the unique datasets and/or data elements found to be common among data assets) in generating predictions of data flow involving the target data between the data assets. For example, the machine-learning model may be a supervised, unsupervised, or semi-supervised trained model comprising a classifier (e.g., a logistic regression algorithm, clustering algorithm, decision tree, neural network, and/or the like) that generates a prediction on whether target data flows between two data assets (e.g., a pair of data assets). Here, the machine-learning model may process attributes of the data elements identified for two different data assets and generate a prediction as to whether target data flows between the two data assets.

Accordingly, the discovery module 110 may identify a pair of data assets as having a data flow between them involving the target data based on the prediction generated for the pair of data assets satisfying a threshold (e.g., having a prediction value of 0.75 or greater). In addition, the machine-learning model may generate a confidence (confidence value) that is provided along with the prediction. The confidence may represent the machine-learning model's confidence in its generated prediction of the pair of data element's likelihood of having a data flow between them. According to some aspects, the discovery module 110 may also use the confidence in identifying the pair of data assets as having a data flow between them involving the target data. For example, the discovery module 110 may identify a pair of data assets as having a data flow between them based on the prediction for the pair of data assets satisfying a first threshold and the confidence for the prediction satisfying a second threshold.

In addition, the discovery module 110 may then process the predictions generated for the pairs of data assets in identifying the data flow for the target data involving a subset of data assets. According to particular aspects, the discovery module 110 may process the predictions and/or attributes for the data elements identified for the different data assets using a (second) rules-based model in generating the data flow for the target data involving the subset. The rules-based model may process the predictions and/or attributes of the data elements using a set of rules to identify the data flow for the target data between the data assets. For example, the set of rules may include a rule that indicates that if a subset of data assets has pairs of assets with a prediction indicating a flow of target data between the assets and each of the data assets found in the subset include a unique dataset of elements having a common data attribute, then the subset of data assets represents a data flow for the target data. More specifically, for example:

For subset of data assets A, B, C, and D:
If prediction of flow of target data between data asset A and data asset B=true; and
If prediction of flow of target data between data asset B and data asset C=true; and
If prediction of flow of target data between data asset C and data asset D=true; and
If data assets A, B, C, and D each have unique dataset with common data attribute X; then
Subset of data assets A, B, C, and D represent a data flow for the target data.

In addition, the set of rules may include one or more rules that help determine a sequence for the data assets involved in the data flow for the target data. The set of rules may be stored within a data repository found in the discovery computing system 100, or a third-party computing system 150, that is accessible by the discovery module.

Further, according to particular aspects, the discovery module 110 may invoke a robotic module 130 in performing Operations 215 and 220 instead of, or in addition to, what is described above in discovering data elements, data assets, and/or data flows for the target data. As detailed further herein, the robotic module injects test data representing target data into the one or more third-party computing systems 150 and then scans the system(s) 150 to identify the propagation of the test data through the data assets of the system(s) 150. The robotic module 130 can then identify the data element(s) of various data assets that have been populated with the test data. In addition, the robotic module 130 can identify data flows based on the propagation of the test data. Further, the robotic module 130 can generate associations between identified data element(s), associated data assets, identified data flows, and/or known data processing activities that were used in propagating the test data through the data assets. According to some aspects, the associations may be stored within a data repository 120 so that they can be used in the present and/or a future data discovery process as further detailed herein.

At Operation 225, the discovery module 110 identifies one or more data processing activities involving the data elements, data assets, and/or data flows identified as associated with the target data. According to particular aspects, the discovery module 110 uses attributes of the data elements, data assets, and/or data flows for the target data, as well as attributes of known data processing activities in identifying the one or more data processing activities that involve the target data. Accordingly, the discovery module 110 may use a data repository 120 that is accessible by the discovery module 110 in performing this particular operation. The data repository 120 may include information (e.g., records) on attributes for known data elements, data assets, and/or data processing activities. In addition, as previously noted, the data repository 120 may include information (e.g., records) on associations between identified data element(s), data assets, and/or data flows that have been established via the robotic module 130.

According to various aspects, the discovery module 110 may identify correlations between the attributes of the data elements, data assets, data flows for the target data, and/or the attributes of known and/or identified data processing activities in identifying which of the one or more data processing activities are associated with the target data. For instance, the discovery module 110 may identify one or more data elements found in a unique dataset associated with a first data asset as related to a particular type of the target data. For example, the discovery module 110 may identify the one or more data elements found in the unique dataset associated with the first data asset as a phone number data type and an address data type. In addition, the discovery module 110 may identify that the first data asset is found in a data flow for the target data that originates from a second data asset.

The discovery module 110 may also identify one or more data elements found in a unique dataset associated with a third, different data asset as related to the same or similar type of the target data. That is, the discovery module 110 may identify the one or more data elements found in the unique dataset associated with the third, different data asset as a phone number data type and an address data type. In addition, the discovery module 110 may identify that the third data asset is found in a data flow for the target data that also originates from the same, second data asset, thus correlating the unique datasets and data flows for both the first and third data assets.

The discovery module 110 may then identify, from information queried from the data repository 120, that values stored in the data elements for the phone number data type and the address data type found in the unique dataset for the third data asset are acquired by the second data asset via a particular data processing activity such as, for example, a human resources data processing activity. Therefore, based on the correlation and information queried from the data repository 120, the discovery module 110 may identify that values stored in data elements for the phone number data type and/or the address data type found in the unique dataset for the first data asset are also done so by the human resources data processing activity.

According to particular aspects, the discovery module 110 may identify correlations based on other types of attributes of data elements associated with various data assets and/or attributes of data processing activities. For example, the system may determine that values for one or more data elements stored in a first data asset were stored at a particular time and date. That is to say, the one or more data elements for the first data asset have particular storage time and date attributes. The discovery module 110 may then identify that the values for one or more data elements stored in a second data asset used by a particular data processing activity were also stored at the same (or similar) time and date. That is to say, the one or more data elements for the second data asset have the same or similar storage time and date attributes. Thus, the discovery module 110 may then identify that values stored for the data elements on the second data asset are also done so via the particular data processing activity and therefore, the second data asset is associated with the particular data processing activity.

According to some aspects, the discovery module 110 may identify correlations between attributes of data elements between data assets in identifying data processing activities involving target data. For example, the discovery module 110 may identify a correlation of timestamps associated with different data elements stored on two different data assets. The discovery module 110 may determine that a first data asset used by a particular data processing activity has an updated record stored for sending an email to a user with a particular timestamp. The discovery module 110 may then determine that a similar updated record associated with the same email and a similar timestamp has been stored in a second, different data asset. The discovery module 110 may determine a data flow exists between these two data assets and based on this correlation, identify that both the first and second data assets are involved in the particular processing activity.

According to various aspects, the discovery module 110 may use one or more of a machine-learning model, a rules-based model, and/or any combination thereof in identifying the data processing activities associated with handling the target data. Here, the discovery module 110 may not necessarily identify the correlations, per se, but instead the correlations may be embedded in the machine-learning model and/or rules-based model to identify the data processing activities through training and/or a set of rules. For example, training data used in training the machine-learning model may demonstrate a correlation between attributes of data elements for one or more data assets that the machine-learning model then learns through training to predict whether a particular data processing activity handles the target data. Similarly, a rule may be defined and included in the set of rules that represents a correlation between attributes of data elements for one or more data assets that the rules-based model then applies to predict whether a particular data processing activity handles the target data.

According to particular aspects, the discovery module 110 may process attributes of the data elements, data assets, and/or the identified data flows for the target using a machine-learning model to generate a prediction as to whether a particular data processing activity handles the target data. For example, the machine-learning model may be a supervised, unsupervised, or semi-supervised trained model that generates a prediction for each of a variety of data processing activities as to whether the particular data process activity handles the target data. The particular attributes for the data elements, data assets, and/or data flows that are provided as input to the machine-learning model may be determined during training. The machine-learning model may comprise a classifier such as a logistic regression algorithm, clustering algorithm, decision tree, neural network, and/or the like. According to some aspects, the machine-learning model may be configured as a multi-label classification model that generates a representation (e.g., vector) having a component for each data processing activity in which the component provides a prediction for the corresponding data processing activity. Accordingly, the discovery module 110 may recognize a particular data processing activity is applicable to the target data based on the prediction found in the corresponding component of the representation satisfying a threshold (e.g., based on the prediction value being 0.85 or greater).

In addition, the machine-learning model may generate a confidence (e.g., confidence value) for each prediction. The confidence may represent the machine-learning model's confidence in its generated prediction of a data processing activity's likelihood of handling the target data. According to some aspects, the discovery module 110 may also use the confidence in determining whether a particular data processing activity is applicable. For example, the discovery module 110 may determine a particular data processing activity is applicable based on: (1) the prediction for the particular data processing activity satisfying a first threshold; and (2) the confidence for the prediction satisfying a second threshold.

According to some aspects, the discovery module 110 may use a rules-based model instead of, or in addition to, a machine-learning model in determining whether a data processing activity handles the target data. The rules-based model may apply a set of rules to the identified data elements, data assets, and/or data flows (e.g., attributes thereof) in identifying the data processing activities handling the target data. In some instances, the rules-based model may apply the set of rules to the predictions generated by the machine-learning model. The set of rules may be stored within a data repository 120 found in the discovery computing system 100, or a third-party computing system 150, that is accessible by the discovery module 110. For example, the set of rules may include various rules on matching correlations and/or predictions with data processing activities.

Accordingly to particular aspects, the discovery module 110 may also prompt a user for information that the discovery module 110 may integrate into performing its identification analysis. For instance, if the discovery module 110 is unable to identify a data processing activity (e.g., to an acceptable confidence level) based on the correlations and/or predictions, the discovery module 110 may request additional information from the user that may assist the discovery module 110 in identifying a data processing activity. For example, the discovery module 110 may request additional information with respect to an identified data asset such as what additional data elements that may be handled by the data asset. In another example, the discovery module may request additional information on one or more data elements found associated with a data asset such as what type of data is stored in the one or more data elements. The discovery module 110 may then conduct the identification analysis again using the information solicited from the user such as providing the solicited information as further input to the machine-learning model and/or the rules-based model in identifying the data processing activities that handle the target data.

At Operation 230, the discovery module 110 performs one or more actions based on the results of conducting the data discovery process. For instance, the discovery module 110 may record the data discovery results in a data repository found in the discovery computing system 100 or externally, such as, for example, a data repository found in a third-party computing system 150. In addition, or instead, the discovery module 110 may communicate the data discovery results to the third-party associated with the third-party system(s) 150 that were investigated.

Furthermore, according to various aspects, a suitable computing system, such as the discovery computing system 100 and/or a third-party computing system 150, may perform one or more actions based on the data discovery results. For instance, a suitable computing system may use the recorded data discovery results in processing requests with respect to the target data. For example, the target data may be the personal data of individuals that is handled by an entity. The entity may receive requests from individuals who have asked to view, receive, access, revise, delete, and/or the like of any personal data that the entity currently has for the individuals. Therefore, the suitable computing system may use the data discovery results in identifying the processing activities and/or data assets that may be associated with the individuals' personal data so that the requests can be processed appropriately. For example, the suitable computing system may use the results in identifying the data processing activities involved in handing the personal data in which the individuals' personal data was stored in one or more data assets so that such data can be accessed, retrieved, deleted, and/or the like for the received requests. Thus, the data discovery process according to various aspects can assist in identifying the data processing activities and/or data assets associated with handling the personal data from large volumes of data, spread over multiple computing systems that can enable the entity to appropriately process the requests received from individuals. That is to say, the data discovery process according to various aspects can enable the building of a data model for more efficiently querying target data from the large volumes of data, spread over multiple computing systems, in processing a request associated with the target data.

In another example, the suitable computing system may use the data discovery results to identify risks that may be associated with the target data due to the data processing activities and/or data assets identified as associated with the target data. Again, the target data may be personal data processed by an entity. Here, the data discovery results may identify that a particular processing activity is being used to handle the personal data. However, the particular processing activity may not be handling the personal data in a secure manner. For example, the processing activity may involve transferring the personal data to an external system without first encrypting the personal data. This may be performed without the entity (personnel of the entity, such as a privacy officer) being aware of the processing activity is handling the personal data and transferring the personal data in an unencrypted state, thus putting the entity at risk (exposing the entity) of experiencing a privacy-related data incident (e.g., data breach) involving the personal data.

Accordingly, the suitable computing system may recognize the risk based on the data discovery results and have one or more actions performed to address/mitigate the risk. For example, the suitable computing system may have a communication sent to proper personnel so that they are made aware of the risk. In another example, the suitable computing system may have the data processing activity suspended so that the personal data is no longer transferred. Yet in another example, the suitable computing system may initiate a process to have the personal data encrypted prior to being transferred by the data processing activity. Those of ordinary skill in the art can recognize other actions that may be performed based on the data discovery results in light of this disclosure.

Robotic Module

Figure 5:
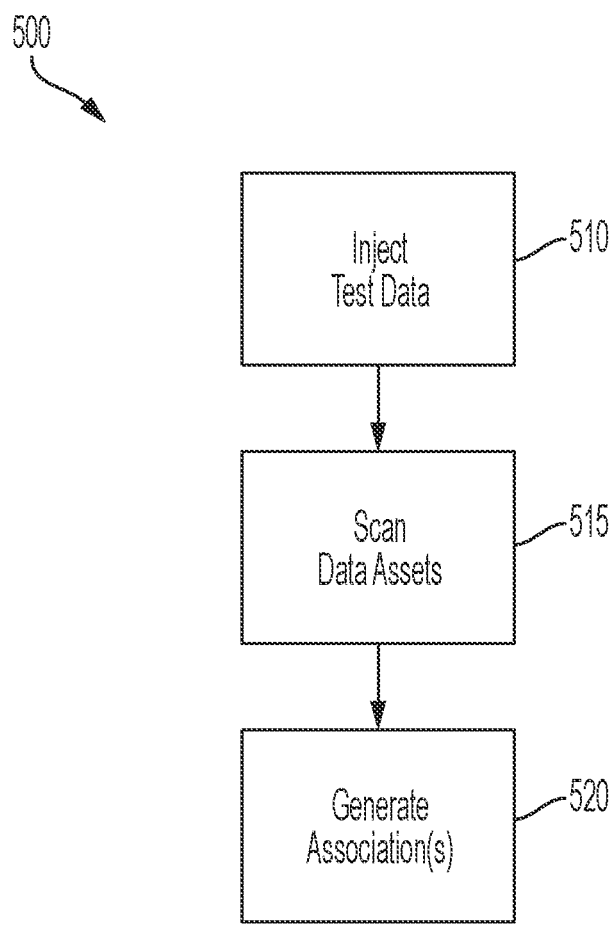
FIG. 5 is a flowchart of a process for determining data assets used by a data processing activity in accordance with various aspects of the present disclosure.

As previously mentioned, a robotic module 130 can be used according to various aspects to identify data elements associated with various data assets by injecting test data for the data elements into one or more third-party computing systems 150. According to some aspects, the robotic module 130 is invoked by the discovery module 110 in identifying such data elements. However, with that said, the robotic module 130 may be invoked by another module and/or may executed as a stand-alone module. Turning now to FIG. 5, additional details are provided regarding a robotic module 130 for identifying data elements associated with various data assets in accordance with various aspects of the disclosure. For instance, the flow diagram shown in FIG. 5 may correspond to operations carried out, for example, by computing hardware found in the discovery computing system 100 as described herein, as the computing hardware executes the robotic module 130.

The process 500 involves the robotic module 130 initially injecting test data into one or more third-party computing systems 150 in Operation 510. According to various aspects, the robotic module 130 may use an input computing system that is a part of the third-party system(s) 150 for injecting the test data into the third-party computing system(s) 150. For example, the input computing system may comprise a data asset such as a Web server that provides a website in which visitors can visit to enter target data. In some instances, the input computing system may be associated with a known data processing activity such as generating a user account for a visitor to the website. Here, the website may provide a visitor with one or more webforms in which the visitor provides requested information to set up the user account. Accordingly, some of the information provided by the user may be considered target data. For example, the user may be requested to provide his or her first and last name, email address, home address, social security number, date of birth, and/or the like. Such information may be considered personal data and the third party associated with the website may be interested in identifying how the personal data is handled through the one or more computing systems 150 of the third party. Therefore, the robotic module 130 may provide the requested information as test data in the one or more webforms to inject the test data into the one or more third-party computing systems 150.

In other instances, the input computing system may not necessarily be associated with a known data processing activity for the target data. Here, the third party may be interested in identifying how test data propagates from the input computing system through the one or more third-party computing systems 150. According to various aspects, the robotic module 130 may communicate with the input computing system through one or more interfaces so that the robotic module 130 can inject the test data into the third-party computing systems 150 via the input computing system. For example, the discovery module 110 may use one or more APIs to communicate and access the input computing system and inject the test data.

Once the test data have been injected, the robotic module 130 scans the data assets found in the third-party computing system(s) 150 for the test data in Operation 515 to identify the data assets in which the test data is found. Similar to the discovery module 110, the robotic module 130 may download and/or install software (e.g., system crawler, spider, bot, and/or the like) within the third-party computing system(s) 150 that can be used in identifying the test data associated with various data assets (e.g., data elements thereof) found in the third-party computing system(s) 150. Accordingly, the software may scan each data asset of the third-party computing system(s) 150 to identify those data assets in which the test data is found.

At Operation 520, the robotic module 130 generations associations between the data assets in which the test data is found, the data elements used by the data assets for the test data, data flow through the data assets, and/or one or more data processing activities involved in propagating the test data through the data assets. According to some aspects, the robotic module 130 may store the associations (e.g., as one or more records) in a data repository 120 so that the associations can be used in a present and/or future data discovery process. For example, if a known data processing activity has been used to inject the test data into the one or more third-party computing systems 150, then the robotic module 130 may record an association between the known data processing activity, the data assets in which the test data was found, and/or the data elements used by the data assets for the test data. In addition, the robotic module 130 may record an association between the known data processing activity and a data flow through the data assets in which the test data is found. Further, the robotic module 130 may record one or more attributes for the known data processing activity, the data assets, and/or the data elements. Such information may be useful in conducting a present and/or future data discovery process.

If a known data processing activity has not been used to inject the test data into the one or more third-party computing systems 150, then the robotic module 130 may record an association between the data assets in which the test data is found, the data elements used by the data assets for the test data, and/or a data flow through the data assets in which the test data is found. According to some aspects, the robotic module 130 may identify the association as a "discovered" and/or "identified" data processing activity. That is to say, the robotic module 130 may identify data processing activities that process target data that may have not been previously known to the third party. Once recorded, the discovery module 110 according to various aspects may use the associations recorded in the data repository 120 in conducting a present and/or future data discovery process.

Figure 6:
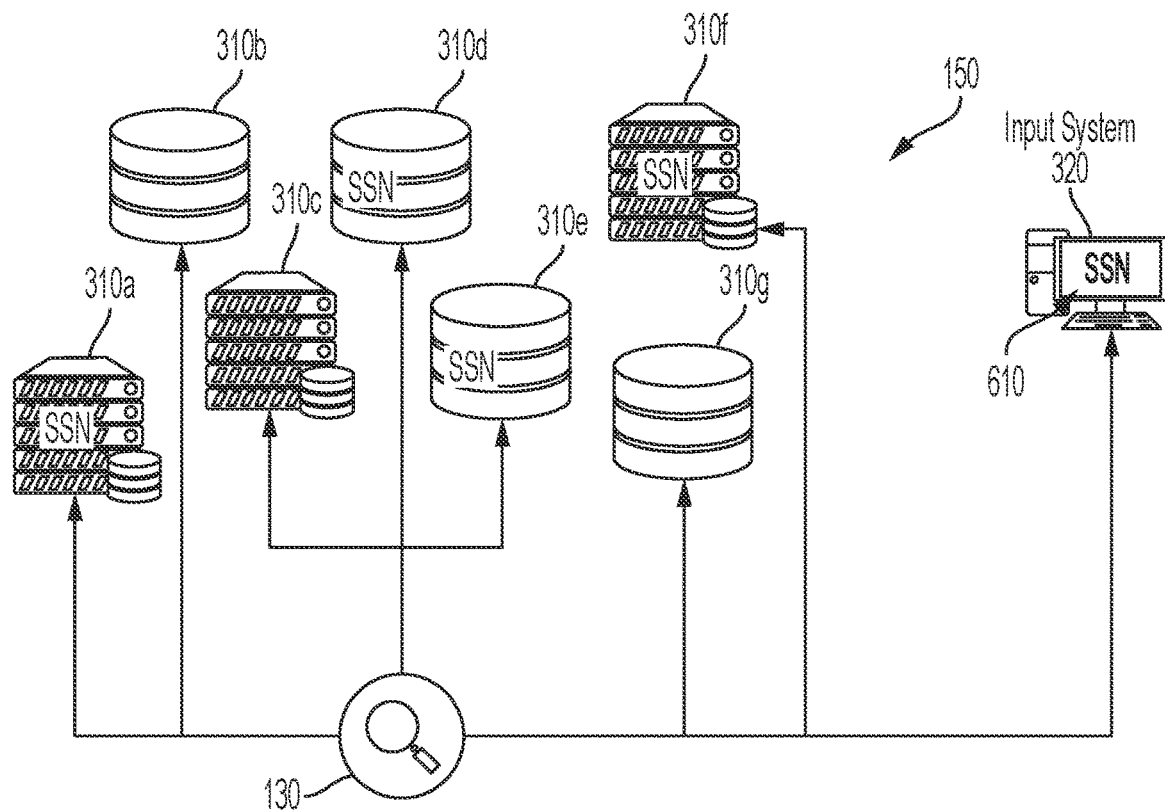
FIG. 6 depicts an example of submitting test data in accordance with various aspects of the present disclosure.
Figure 7:
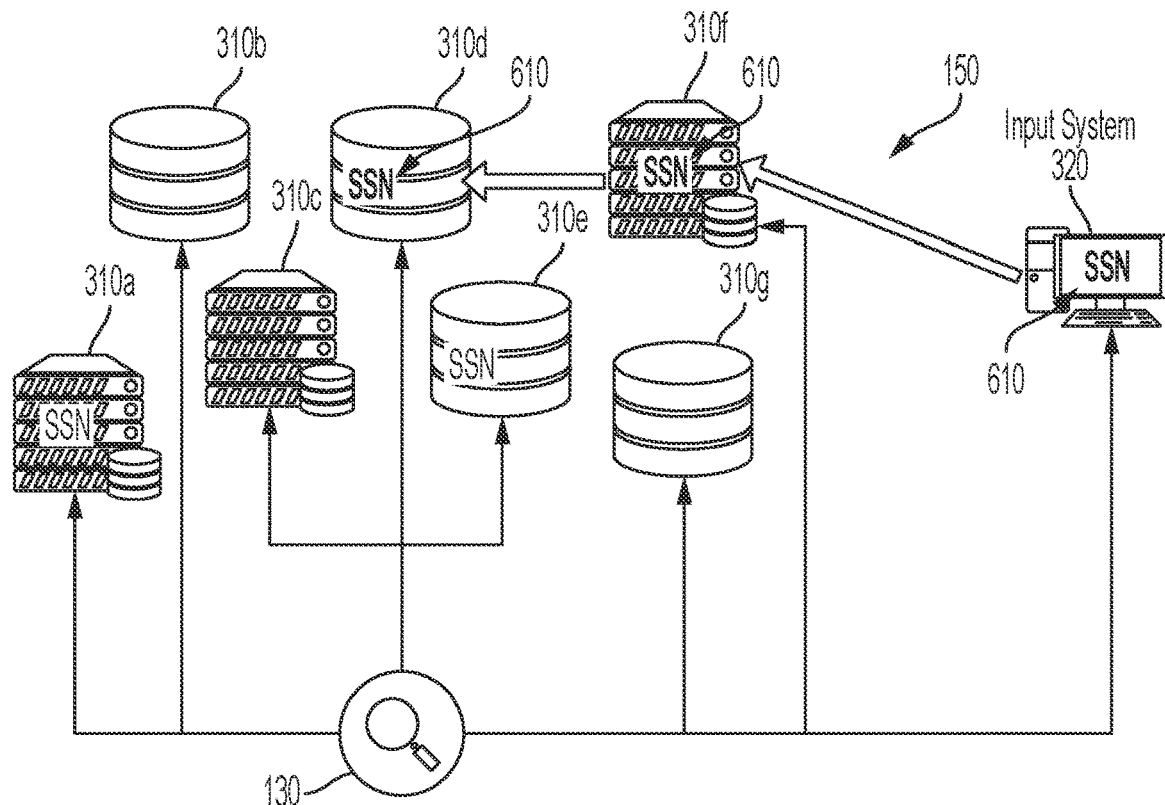
FIG. 7 depicts a further example of submitting test data in accordance with various aspects of the present disclosure.

Referring now to FIG. 6, an example is provided of the robotic module 130 submitting test data 610 into an input computing system 320 for a particular data element, in this case a social security number. The robotic module 130 may then propagate the test data through one or more third-party computing systems 150 by executing a particular processing activity using the test data. As shown in FIG. 7, the test data 610 has been propagated to the data assets 310*f* and 310*d* via the input computing system 320. The robotic module 130 may then scan the data assets 310*a-g* to identify that the particular test data has been stored at the data assets 310*f* and 310*d*. The robotic module 130 may then generate and store a record in the data repository 120 indicating an association between the particular data processing activity, the data assets 310*f*, 310*d*, and/or the particular data element indicating the particular data processing activity as storing values for the particular data element at data assets 310*f* and 310*d* when executed. The association may then be used in performing a present and/or future data discovery process. For example, the discovery module 110 may identify that the particular data element is associated with another data asset similar to data assets 310*f* and 310*d* found in one or more third-party computing systems 150. As a result, the discovery module 110 may identify that the newly identified data asset is also associated with the particular processing activity.

Example Technical Platforms

Aspects of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

According to various aspects, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

According to various aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example of aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 8:
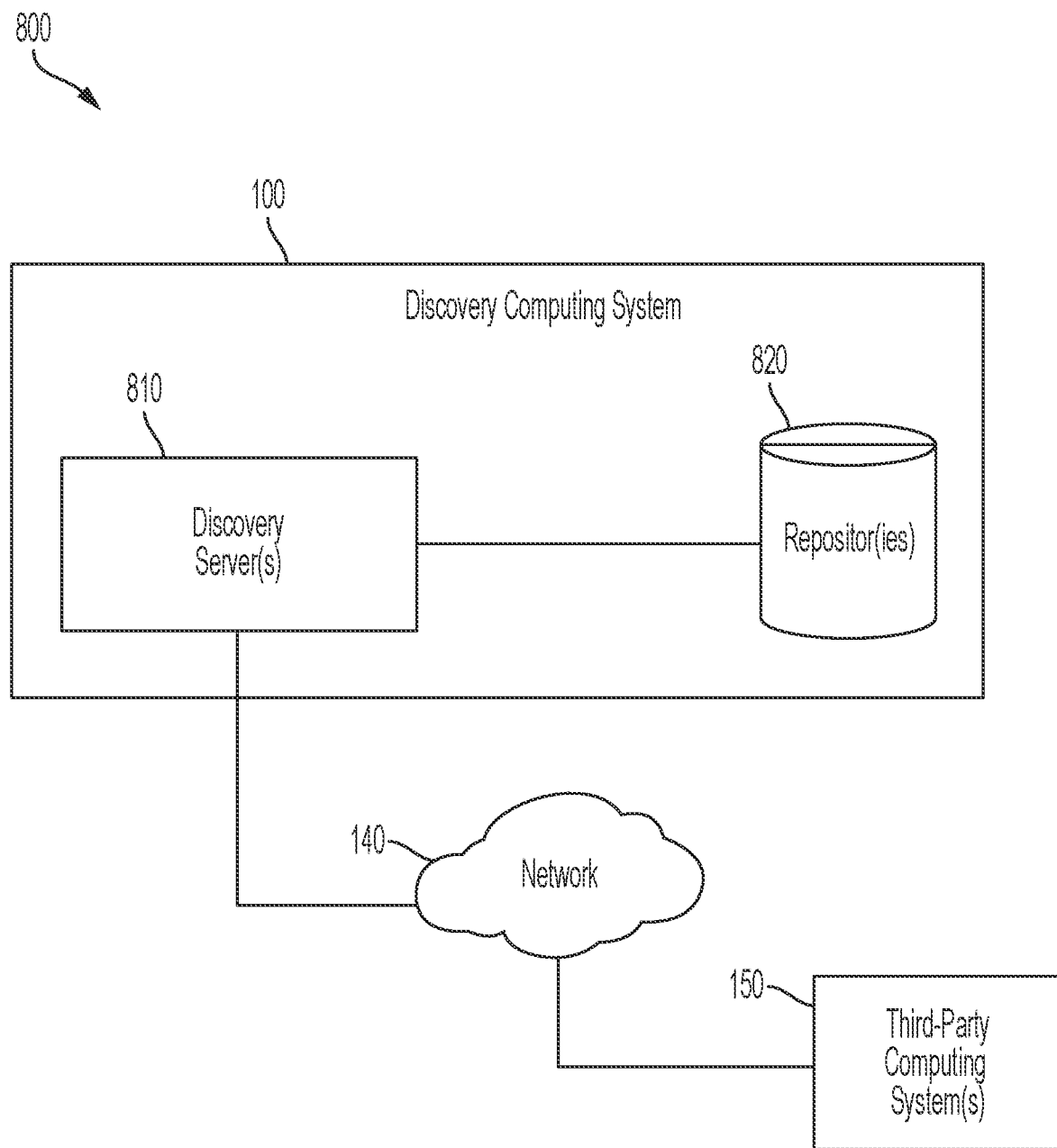
FIG. 8 is a block diagram illustrating a system architecture that may be used in accordance with various aspects of the present disclosure.

FIG. 8 is a block diagram of a system architecture 800 that can be used in conducting the data discovery process according to various aspects of the disclosure as detailed herein. Accordingly, entities of the system architecture 800 are configured according to various aspects to identifying data elements, data assets, data flows, and/or data processing activities that are found in one or more third-party computing systems 150 and used in handling target data. As may be understood from FIG. 8, the system architecture 800 according to various aspects may include a discovery computing system 100 that comprises one or more discovery servers 810 and one or more data repositories 820. For example, the one or more data repositories 820 may include a data repository 120 for storing information on various data elements, data assets, and data processing activities, as well as a data repository used for storing sets of rules, as described herein. Although the discovery server(s) 810 and repositor(ies) 820 are shown as separate entities, it should be understood that according to other aspects, these entities 810, 820 may comprise a single server and/or repository, a plurality of servers and/or repositories, one or more cloud-based servers and/or repositories, or any other suitable configuration.

The discovery server(s) 810 may communicate, access, analyze, and/or the like the one or more third-party computing systems 150 over a network 140 and may execute a discovery module 110 and/or robotic module 130 as described herein to conduct a data discovery process on the one or more third-party computing system 150. Accordingly, the robotic module 130 can store records on identified associations between data elements, data assets, data flows, and/or data process activities for the third-party computing system(s) that can then be accessed and used by the discovery module 110 in conducting the data discovery process.

In addition, according to particular aspects, the discovery server(s) 810 provide one or more interfaces through which the discovery computing system 100 communicates with the third-party computing system(s) 150, as well as one or more interfaces (e.g., websites, transfer protocol interfaces, and/or the like) for displaying and/or communicating data discovery results of the data discovery process. Thus, the discovery server(s) 810 may interface with the third-party computing system(s) 150 via one or more suitable application programming interfaces (APIs), direct connections, and/or the like.

Example Computing Hardware

Figure 9:
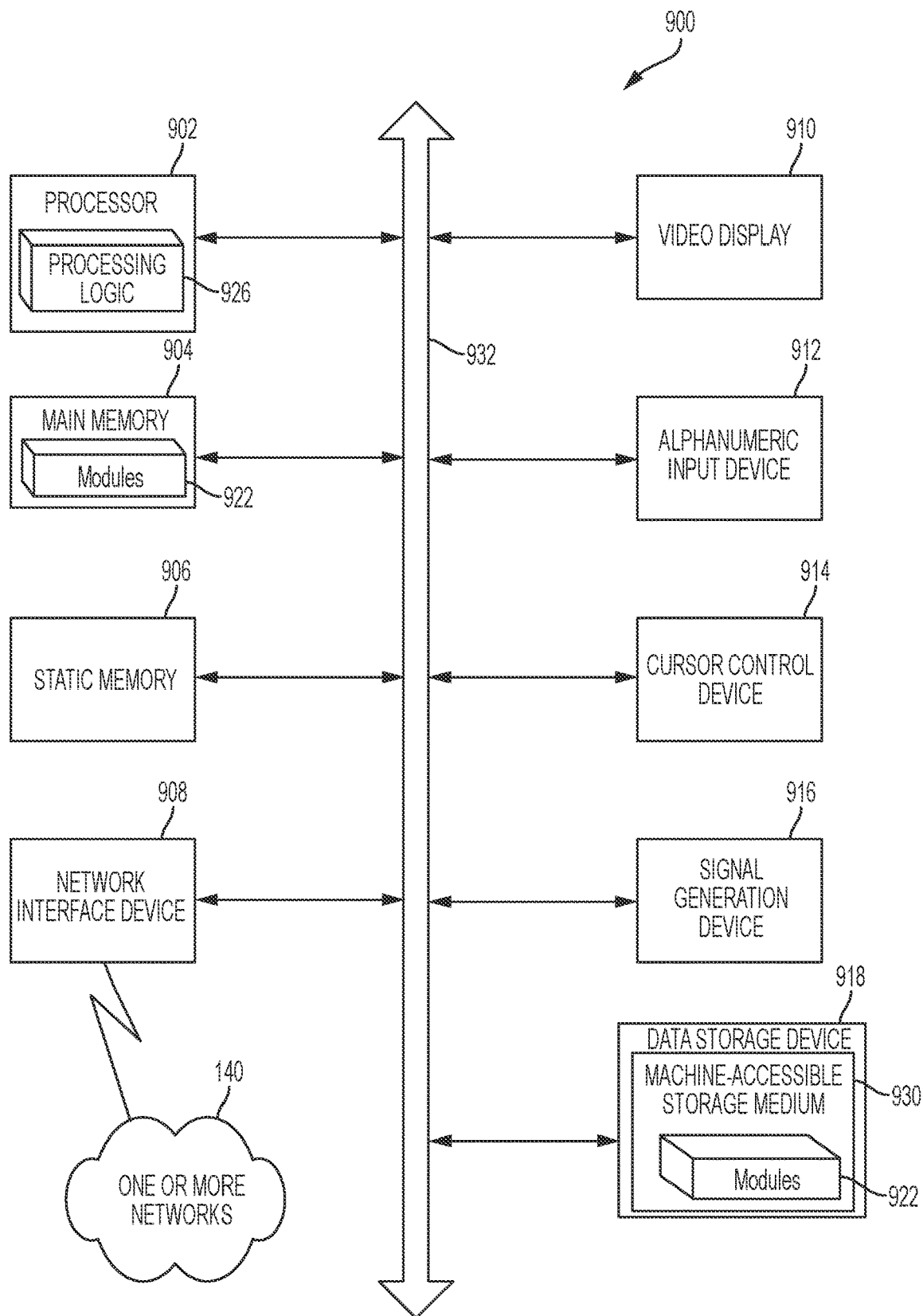
FIG. 9 is a schematic diagram of a computing entity that may be used in accordance with various aspects of the present disclosure.

FIG. 9 illustrates a diagrammatic representation of a computing hardware device 900 that may be used in accordance with various aspects of the disclosure. For example, the hardware device 900 may be computing hardware such as a discovery server 810 as described in FIG. 8. According to particular aspects, the hardware device 900 may be connected (e.g., networked) to one or more other computing entities, storage devices, and/or the like via one or more networks such as, for example, a LAN, an intranet, an extranet, and/or the Internet. As noted above, the hardware device 900 may operate in the capacity of a server and/or a client device in a client-server network environment, or as a peer computing device in a peer-to-peer (or distributed) network environment. According to various aspects, the hardware device 900 may be a personal computer (PC), a tablet PC, a set-top box (STB), a Personal Digital Assistant (PDA), a mobile device (smartphone), a web appliance, a server, a network router, a switch or bridge, or any other device capable of executing a set of instructions (sequential or otherwise) that specify actions to be taken by that device. Further, while only a single hardware device 900 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 900 includes a processor 902, a main memory 904 (e.g., read-only memory (ROM), flash memory, dynamic random-access memory (DRAM) such as synchronous DRAM (SDRAM), Rambus DRAM (RDRAM), and/or the like), a static memory 906 (e.g., flash memory, static random-access memory (SRAM), and/or the like), and a data storage device 918, that communicate with each other via a bus 932.

The processor 902 may represent one or more general-purpose processing devices such as a microprocessor, a central processing unit, and/or the like. According to some aspects, the processor 902 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 902 may be one or more special-purpose processing devices such as an application specific integrated circuit (ASIC), a field programmable gate array (FPGA), a digital signal processor (DSP), network processor, and/or the like. The processor 902 can execute processing logic 926 for performing various operations and/or steps described herein.

The hardware device 900 may further include a network interface device 908, as well as a video display unit 910 (e.g., a liquid crystal display (LCD), a cathode ray tube (CRT), and/or the like), an alphanumeric input device 912 (e.g., a keyboard), a cursor control device 914 (e.g., a mouse, a trackpad), and/or a signal generation device 916 (e.g., a speaker). The hardware device 900 may further include a data storage device 918. The data storage device 918 may include a non-transitory computer-readable storage medium 930 (also known as a non-transitory computer-readable storage medium or a non-transitory computer-readable medium) on which is stored one or more modules 922 (e.g., sets of software instructions) embodying any one or more of the methodologies or functions described herein. For instance, according to particular aspects, the modules 922 include a discovery module 110 and/or a robotic module 130 as described herein. The one or more modules 922 may also reside, completely or at least partially, within main memory 904 and/or within the processor 902 during execution thereof by the hardware device 900—main memory 904 and processor 902 also constituting computer-accessible storage media. The one or more modules 922 may further be transmitted or received over a network 140 via the network interface device 908.

While the computer-readable storage medium 930 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 900 and that causes the hardware device 900 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

CONCLUSION

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may generally be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

What is claimed:

1. A method comprising:
   executing, by computing hardware, a processing activity to inject test data into a computing system, wherein:
      the test data represents target data;
      the computing system comprises a plurality of data assets; and
      executing the processing activity to inject the test data into the computing system causes a propagation of the test data through the plurality of data assets for the computing system;
   scanning, by the computing hardware, the plurality of data assets to identify a subset of data assets found in the plurality of data assets, wherein the test data is found in each data asset in the subset of data assets;
   identifying, by the computing hardware, a plurality of data elements associated with the subset of data assets that are used for the target data based on the plurality of data elements containing the target data;
   identifying, by the computing hardware and based on the propagation of the test data through the plurality of data assets for the computing system, a data flow for the target data between the subset of data assets;
   generating, by the computing hardware, at least one association between at least one of the processing activity, the subset of data assets, the plurality of data elements, or the data flow for the target data; and
   causing, by the computing hardware and based on the at least one association, performance of an action involving the target data.

2. The method of claim 1 further comprising identifying the plurality of data assets associated with the computing system via software installed within the computing system that scans the computing system to identify the plurality of data assets.

3. The method of claim 1 further comprising identifying, by the computing hardware and based on at least one of the subset of data assets, the plurality of data elements, or the data flow, a second processing activity that involves handing the target data.

4. The method of claim 3, wherein identifying the second processing activity is performed using a data repository comprising information on at least one of known data elements, known data assets, or known processing activities.

5. The method of claim 1, wherein scanning the plurality of data assets involves installing software within the computing system that scans each data asset of the plurality of data assets to identify the subset of data assets.

6. The method of claim 1, wherein the action comprises:
   receiving a request from an individual to at least one of view, receive, access, revise, or delete the target data for the individual from the computing system;
   identifying, based on the at least one association, the target data found in the computing system for the individual; and
   processing the request to at least one of provide, revise, or delete the target data found in the computing system for the individual.

7. The method of claim 1, wherein the action comprises:
   identifying a risk associated with at least one of the processing activity, the subset of data assets, the plurality of data elements, or the data flow; and
   responsive to identifying the risk, performing at least one of communicating the risk to an individual, initiating a process to suspend the processing activity, or initiating a process to encrypt the target data.

8. A system comprising:
   a non-transitory computer-readable medium storing instructions; and
   a processing device communicatively coupled to the non-transitory computer-readable medium,
   wherein, the processing device is configured to execute the instructions and thereby perform operations comprising:
      injecting test data into a computing system, wherein:
         the test data represents target data;
         the computing system comprises a plurality of data assets; and
         injecting the test data into the computing system causes a propagation of the test data through the plurality of data assets for the computing system;
      scanning the plurality of data assets to identify a subset of data assets found in the plurality of data assets, wherein the test data is found in each data asset in the subset of data assets;
      identifying a plurality of data elements associated with the subset of data assets that are used for the target data based on the plurality of data elements containing the target data;
      identifying, based on the propagation of the test data through the plurality of data assets for the computing system, a data flow for the target data between the subset of data assets;
      generating at least one association between at least one of the subset of data assets, the plurality of data elements, or the data flow for the target data; and causing, based on the at least one association, performance of an action involving the target data.

9. The system of claim 8, wherein the operations further comprise identifying the plurality of data assets associated with the computing system from information gathered by software installed within the computing system that scans the computing system.

10. The system of claim 8, wherein the operations further comprising identifying, based on at least one of the subset of data assets, the plurality of data elements, or the data flow, a processing activity that involves handing the target data.

11. The system of claim 10, wherein identifying the processing activity is performed using a data repository comprising information on at least one of known data elements, known data assets, or known processing activities.

12. The system of claim 8, wherein scanning the plurality of data assets involves installing software within the computing system that scans each data asset of the plurality of data assets to identify the subset of data assets.

13. The system of claim 8, wherein the action comprises:
receiving a request from an individual to at least one of view, receive, access, revise, or delete the target data for the individual from the computing system;
identifying, based on the at least one association, the target data found in the computing system for the individual; and
processing the request to at least one of provide, revise, or delete the target data found in the computing system for the individual.

14. The system of claim 8, wherein injecting the test data into the computing system comprises at least one of executing a processing activity to inject the test data into the computing system or entering the test data into an input computing system connected to the computing system to inject the test data into the computing system.

15. A non-transitory computer-readable medium storing computer-executable instructions that, when executed by computing hardware, configure the computing hardware to perform operations comprising:
injecting test data into a computing system, wherein:
the test data represents target data;
the computing system comprises a plurality of data assets; and
injecting the test data into the computing system causes a propagation of the test data through the plurality of data assets for the computing system;
scanning the plurality of data assets to identify a subset of data assets found in the plurality of data assets, wherein the test data is found in each data asset in the subset of data assets;
identifying, based on the propagation of the test data through the plurality of data assets for the computing system, a data flow for the target data between the subset of data assets;
identifying, based on at least one of the subset of data assets or the data flow, a processing activity associated with the subset of data assets that is used for handling the target data;
generating at least one association between at least one of the processing activity, the subset of data assets, or the data flow for the target data; and
causing, based on the at least one association, performance of an action involving the target data.

16. The non-transitory computer-readable medium of claim 15, wherein the operations further comprise identifying the plurality of data assets associated with the computing system from information gathered by software installed within the computing system that scans the computing system.

17. The non-transitory computer-readable medium of claim 15, wherein identifying the processing activity is performed using a data repository comprising information on at least one of known data assets or known processing activities.

18. The non-transitory computer-readable medium of claim 15, wherein scanning the plurality of data assets involves installing software within the computing system that scans each data asset of the plurality of data assets to identify the subset of data assets.

19. The non-transitory computer-readable medium of claim 15, wherein the action comprises:
receiving a request from an individual to at least one of view, receive, access, revise, or delete the target data for the individual from the computing system;
identifying, based on the at least one association, the target data found in the computing system for the individual; and
processing the request to at least one of provide, revise, or delete the target data found in the computing system for the individual.

20. The non-transitory computer-readable medium of claim 15, wherein injecting the test data into the computing system comprises at least one of executing a second processing activity to inject the test data into the computing system or entering the test data into an input computing system connected to the computing system to inject the test data into the computing system.

* * * * *